(12) United States Patent
Kawano et al.

(10) Patent No.: US 12,305,302 B2
(45) Date of Patent: May 20, 2025

(54) WATER ELECTROLYSIS SYSTEM

(71) Applicant: HONDA MOTOR CO., LTD., Tokyo (JP)

(72) Inventors: Takumi Kawano, Wako (JP); Yuta Hoshi, Wako (JP); Shoji Takasugi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 18/530,433

(22) Filed: Dec. 6, 2023

(65) Prior Publication Data

US 2024/0191377 A1    Jun. 13, 2024

(30) Foreign Application Priority Data

Dec. 9, 2022 (JP) ................. 2022-196891

(51) Int. Cl.
| | |
|---|---|
| *C25B 15/029* | (2021.01) |
| *C25B 1/04* | (2021.01) |
| *C25B 9/23* | (2021.01) |
| *C25B 9/65* | (2021.01) |
| *C25B 9/77* | (2021.01) |
| *C25B 15/023* | (2021.01) |
| *C25B 15/08* | (2006.01) |

(52) U.S. Cl.
CPC ............. *C25B 15/029* (2021.01); *C25B 1/04* (2013.01); *C25B 9/23* (2021.01); *C25B 9/65* (2021.01); *C25B 9/77* (2021.01); *C25B 15/023* (2021.01); *C25B 15/085* (2021.01)

(58) Field of Classification Search
CPC ........ C25B 1/04; C25B 15/029; C25B 15/023
See application file for complete search history.

(56) References Cited

U.S. PATENT DOCUMENTS

| | | | |
|---|---|---|---|
| 5,690,797 | A | 11/1997 | Harada et al. |
| 11,746,430 | B2 * | 9/2023 | Lee ............. C25B 15/023 |
| | | | 204/278 |
| 2021/0130966 | A1 | 5/2021 | Griffis et al. |
| 2021/0355590 | A1 * | 11/2021 | Homma ............. C25B 1/04 |
| 2022/0042192 | A1 | 2/2022 | Mitsuta |
| 2022/0106695 | A1 * | 4/2022 | Uchino ............ C25B 15/02 |
| 2022/0166041 | A1 | 5/2022 | Mitsuta |
| 2022/0333260 | A1 | 10/2022 | Do et al. |
| 2022/0356586 | A1 | 11/2022 | Mitsuta et al. |

(Continued)

FOREIGN PATENT DOCUMENTS

| | | | |
|---|---|---|---|
| CN | 110366608 A | 10/2019 | |
| CN | 114540830 A | 5/2022 | |
| CN | 115233249 A | 10/2022 | |

(Continued)

OTHER PUBLICATIONS

Office Action dated Mar. 12, 2025 issued in the corresponding Chinese Patent Application No. 202311682521.5 with the English machine translation thereof.

*Primary Examiner* — Brian W Cohen
(74) *Attorney, Agent, or Firm* — Carrier, Shende & Associates P.C.; Fulchand P. Shende; Joseph P. Carrier

(57) ABSTRACT

A water electrolysis system controls a power supply device for passing a current between an anode and a cathode in a water electrolysis stack, based on a hydrogen concentration detected by a concentration sensor provided in a discharge pipe at a location downstream of a pressure control valve.

8 Claims, 4 Drawing Sheets

(56) References Cited

U.S. PATENT DOCUMENTS

2023/0332317 A1* 10/2023 Karuppaiah .......... C25B 15/029

FOREIGN PATENT DOCUMENTS

| CN | 115386904 | A | 11/2022 |
|----|-----------|---|---------|
| JP | H08-193287 | A | 7/1996 |
| JP | 2022-029892 | A | 2/2022 |
| JP | 2022-083098 | A | 6/2022 |
| JP | 2022-172655 | A | 11/2022 |
| KR | 2021-0103780 | A | 8/2021 |

* cited by examiner

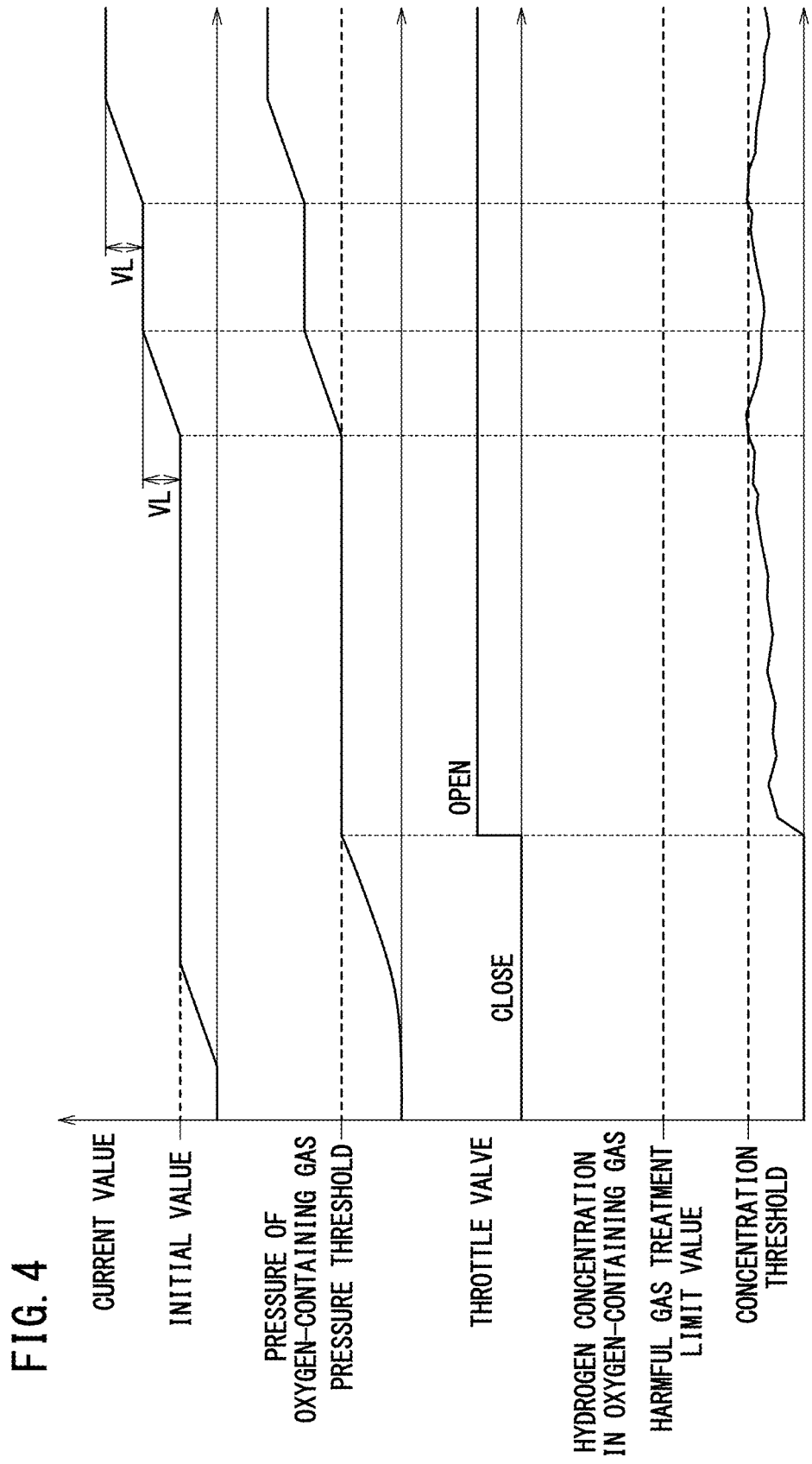

WATER ELECTROLYSIS SYSTEM

CROSS-REFERENCE TO RELATED APPLICATIONS

This application is based upon and claims the benefit of priority from Japanese Patent Application No. 2022-196891 filed on Dec. 9, 2022, the contents of which are incorporated herein by reference.

BACKGROUND OF THE INVENTION

Field of the Invention

The present invention relates to a water electrolysis system.

Description of the Related Art

In recent years, research and development have been conducted on systems including water electrolysis stacks that contribute to energy efficiency in order to ensure that more people have access to affordable, reliable, sustainable and modern energy.

The water electrolysis stack electrolyzes water to generate hydrogen gas and oxygen gas. For example, JP 2022-029892 A discloses a water electrolysis system provided with a water electrolysis stack.

The water electrolysis system disclosed in JP 2022-029892 A is provided with a water electrolysis device, and an oxygen gas discharge regulating unit. The water electrolysis device includes an anode and a cathode separated from each other with an ion exchange membrane interposed therebetween. The oxygen gas discharge regulating unit regulates discharge of the oxygen gas generated at the anode to make the pressure of the oxygen gas generated at the anode higher than the pressure of the hydrogen gas generated at the cathode. This prevents the hydrogen gas from permeating through the ion exchange membrane from the cathode toward the anode. Therefore, the hydrogen concentration in oxygen-containing gas that contains the oxygen gas generated at the anode is reduced.

SUMMARY OF THE INVENTION

However, since hydrogen gas is harmful, it is required to further reduce the amount of the hydrogen gas mixed into the oxygen-containing gas.

The present invention has the object of solving the aforementioned problem.

According to an aspect of the present invention, there is provided a water electrolysis system comprising: a water electrolysis stack including an electrolyte membrane, and an anode and a cathode that sandwich the electrolyte membrane; a power supply device configured to pass a current between the anode and the cathode; a pressure control valve configured to narrow a passage of a discharge pipe through which oxygen-containing gas flows, the oxygen-containing gas being discharged from the water electrolysis stack and containing oxygen gas generated by water electrolysis in the water electrolysis stack; a concentration sensor provided in the discharge pipe at a location downstream of the pressure control valve, and configured to detect a hydrogen concentration in the oxygen-containing gas; and a control device configured to control the power supply device, wherein the control device adjusts the current passed between the anode and the cathode based on the hydrogen concentration.

According to the above aspect, even when a change occurs in the temperature of the water electrolysis stack, the degree of progress of deterioration of the electrolyte membrane, or the like, the hydrogen concentration in the oxygen-containing gas can be kept at a low level.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a time chart during the control process.

DETAILED DESCRIPTION OF THE INVENTION

Figure 1:
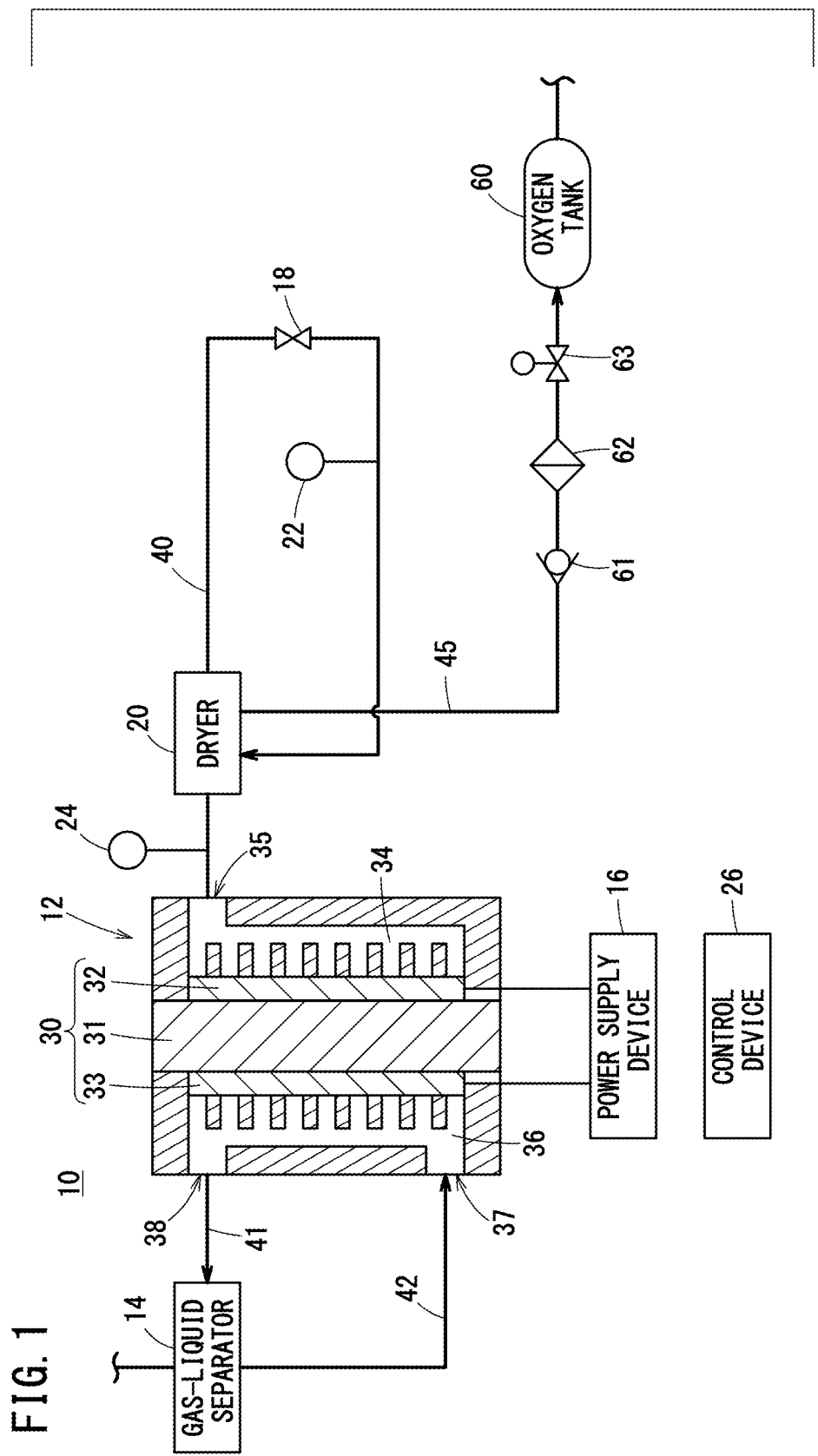
FIG. 1 is a schematic diagram illustrating a configuration of a water electrolysis system according to an embodiment.

FIG. 1 is a schematic diagram illustrating a configuration of a water electrolysis system 10 according to an embodiment. The water electrolysis system 10 may be used in a closed space. The water electrolysis system 10 includes a water electrolysis stack 12, a gas-liquid separator 14, a power supply device 16, a pressure control valve (throttle valve) 18, a dryer 20, a concentration sensor 22, a pressure sensor 24, and a control device 26.

The water electrolysis stack 12 includes a plurality of unit cells 30 for electrolyzing water. The unit cells 30 have the same configuration. FIG. 1 illustrates only one unit cell 30. Each unit cell 30 includes an electrolyte membrane 31, an anode 32, and a cathode 33. The electrolyte membrane 31 is, for example, an anion exchange membrane that transports hydroxide ions OH. The electrolyte membrane 31 is sandwiched between the anode 32 and the cathode 33.

The anode 32 of each unit cell 30 communicates with an anode outlet 35 of the water electrolysis stack 12 via a first internal flow path 34 of the water electrolysis stack 12. The cathode 33 of each unit cell 30 communicates with a cathode inlet 37 and a cathode outlet 38 of the water electrolysis stack 12 via a second internal flow path 36 of the water electrolysis stack 12.

In each unit cell 30, an electrochemical reaction is performed based on the voltage applied to the anode 32 and the cathode 33. At the cathode 33, a portion of water is decomposed into hydrogen ions $H^+$ and hydroxide ions $OH^-$. At the cathode 33, hydrogen ions $H^+$ receive electrons to generate hydrogen gas. Hydrogen-containing gas that contains the hydrogen gas generated in each unit cell 30 is discharged from the cathode outlet 38 together with water. The hydrogen-containing gas contains water vapor in addition to the hydrogen gas.

The hydroxide ions OH are transported to the anode 32 via the electrolyte membrane 31. At the anode 32, the hydroxide ions OH release electrons to generate oxygen gas together with water. Oxygen-containing gas that contains the oxygen gas generated in each unit cell 30 is discharged from the anode outlet 35. The oxygen-containing gas contains water vapor in addition to the oxygen gas. Further, the oxygen-containing gas contains a small amount of hydrogen gas that has permeated through the electrolyte membrane 31 from the cathode side to the anode side.

The gas-liquid separator 14 separates a discharge fluid discharged from the water electrolysis stack 12 via an output-side circulation pipe 41 into hydrogen-containing gas and liquid water. The hydrogen-containing gas separated by the gas-liquid separator 14 is supplied from the gas-liquid separator 14 to a predetermined hydrogen supply destination. The liquid water separated by the gas-liquid separator 14 is supplied from the gas-liquid separator 14 to the water electrolysis stack 12 via an input-side circulation pipe 42.

The power supply device 16 applies a voltage to the anode 32 and the cathode 33 of each unit cell 30 to pass a current between the anode 32 and the cathode 33. The power supply device 16 is configured to be capable of adjusting a current value of the current passed between the anode 32 and the cathode 33. The current value is adjusted by the control device 26.

The pressure control valve 18 is a valve for narrowing the passage of a discharge pipe 40. The pressure control valve 18 narrows the passage of the discharge pipe 40 to apply pressure to the oxygen-containing gas that contains the oxygen gas generated in the water electrolysis stack 12. Therefore, the pressure of the oxygen-containing gas obtained on the anode side of the water electrolysis stack 12 is higher than the pressure of the hydrogen gas obtained on the cathode side of the water electrolysis stack 12. Accordingly, the crossover of the hydrogen gas permeating through the electrolyte membrane 31 from the cathode side toward the anode side can be suppressed. As a result, the hydrogen concentration in the oxygen-containing gas can be reduced.

In other words, the pressure control valve 18 regulates the discharge of the oxygen-containing gas that contains the oxygen gas generated on the anode side of each unit cell 30 to make the pressure of the oxygen-containing gas higher than the pressure of the hydrogen gas generated on the cathode side of each unit cell 30. The type of the pressure control valve 18 is not particularly limited as long as it is a valve capable of making the pressure of the oxygen-containing gas higher than the pressure of the hydrogen gas. In the present embodiment, the pressure control valve 18 is a solenoid valve whose opening degree is adjustable.

Figure 2:
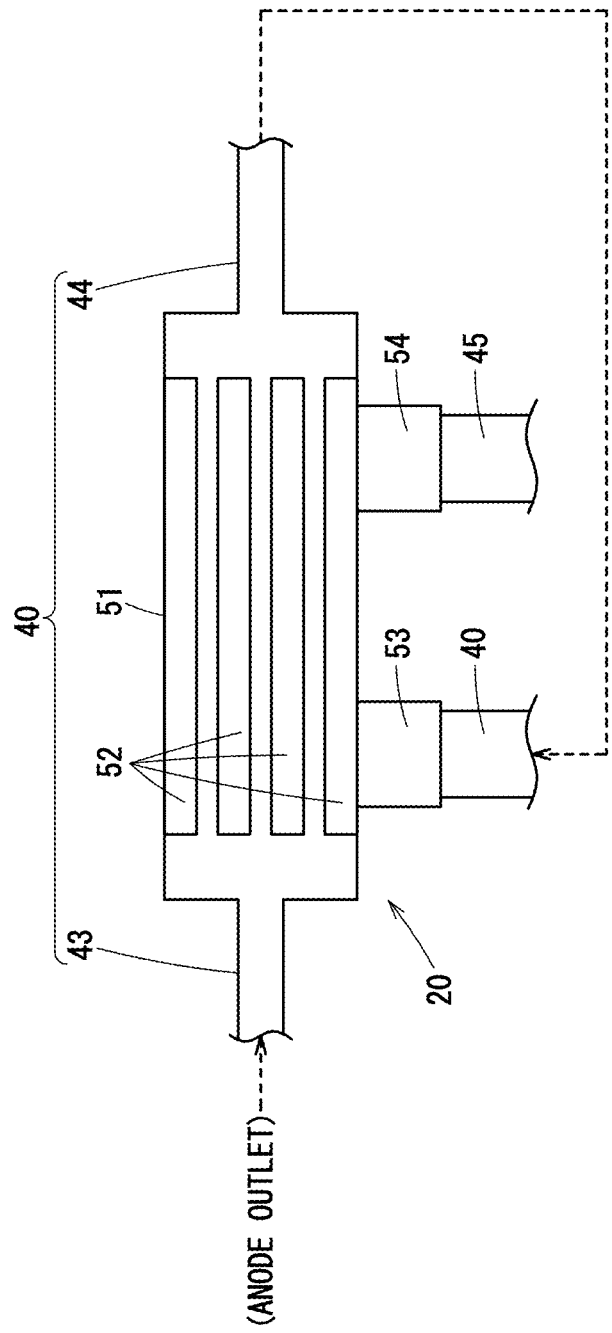
FIG. 2 is a schematic diagram illustrating a configuration of a differential pressure dryer.

The dryer 20 is a device for drying the oxygen-containing gas. The dryer 20 is disposed in the discharge pipe 40 at a location between the water electrolysis stack 12 and the pressure control valve 18. In the present embodiment, the dryer 20 is a differential pressure dryer. FIG. 2 is a diagram illustrating a configuration of the differential pressure dryer.

The dryer 20 includes a conduit body 51 and a plurality of hollow tubes 52. The conduit body 51 is a portion of the discharge pipe 40. The conduit body 51 may be formed integrally with the discharge pipe 40, or may be interposed between an upstream portion 43 and a downstream portion 44 of the discharge pipe 40. FIG. 2 illustrates an example in which the conduit body 51 is interposed between the upstream portion 43 and the downstream portion 44 of the discharge pipe 40.

A gas introduction portion 53 and a gas discharge portion 54 are formed on a wall of the conduit body 51. The gas introduction portion 53 is disposed upstream of the gas discharge portion 54. The gas introduction portion 53 may be disposed upstream of the upstream end of each hollow tube 52. The downstream end portion of the discharge pipe 40 is connected to the gas introduction portion 53. An oxygen supply pipe 45 is connected to the gas discharge portion 54. The oxygen supply pipe 45 is a pipe for supplying wet oxygen. In the present embodiment, the downstream end of the oxygen supply pipe 45 is connected to an oxygen tank 60 (FIG. 1). Further, the oxygen supply pipe 45 is provided with a check valve 61, a filter 62, and a shut-off valve 63 in this order from the upstream side to the downstream side.

Each hollow tube 52 is disposed in an internal space (flow path) of the conduit body 51 and is fixed to the inner wall or the like of the conduit body 51. Each hollow tube 52 is formed of a polymer material that is permeable to water vapor. By using a pressure difference between the inside and the outside of the hollow tube 52, the hollow tube 52 discharges, to a space between the hollow tube 52 and the discharge pipe 40, water vapor contained in the oxygen-containing gas flowing inside the hollow tube 52.

The oxygen-containing gas discharged from the water electrolysis stack 12 to the upstream portion 43 of the discharge pipe 40 flows into the conduit body 51 of the dryer 20. A portion of the oxygen-containing gas flowing into the conduit body 51 passes through the inner space of each hollow tube 52. Further, another portion of the oxygen-containing gas flowing into the conduit body 51 flows out to the oxygen supply pipe 45 from the gas discharge portion 54.

The oxygen-containing gas passing through the inner space of each hollow tube 52 flows into the downstream portion 44 of the discharge pipe 40 from the downstream end portion of the hollow tube 52. The oxygen-containing gas flowing through the downstream portion 44 of the discharge pipe 40 is dry. The oxygen-containing gas in a dry state flows into the space between the conduit body 51 (the discharge pipe 40) and each hollow tube 52 from the gas introduction portion 53 to which the downstream end portion of the discharge pipe 40 is connected. This space is in a wet state, and the oxygen-containing gas flowing into this space is humidified. The humidified oxygen-containing gas flows to the oxygen supply pipe 45 or the downstream portion 44 of the discharge pipe 40.

The concentration sensor 22 is a sensor that detects the hydrogen concentration in the oxygen-containing gas. The concentration sensor 22 is provided in the discharge pipe 40 at a location downstream of the pressure control valve 18. The pressure of the oxygen-containing gas flowing downstream of the pressure control valve 18 becomes lower than the pressure of the oxygen-containing gas flowing upstream of the pressure control valve 18. Therefore, the relative humidity of the oxygen-containing gas decreases. Consequently, compared to a case where the concentration sensor 22 is provided in the discharge pipe 40 at a location upstream of the pressure control valve 18, a decrease in measurement accuracy due to moisture can be suppressed. In addition, the concentration sensor 22 is disposed downstream of the dryer 20. Consequently, a decrease in measurement accuracy due to moisture can be further suppressed.

The pressure sensor 24 is a sensor that detects the pressure of the oxygen-containing gas. The pressure sensor 24 is provided in the discharge pipe 40 at a location between the water electrolysis stack 12 and the pressure control valve 18. In the present embodiment, the pressure sensor 24 is provided in the discharge pipe 40 at a location between the water electrolysis stack 12 and the dryer 20.

The control device 26 is a computer that controls the water electrolysis system 10. The control device 26 includes one or more processors and a storage medium. The storage medium can be constituted by a volatile memory and a non-volatile memory. As an example of the processor, there may be cited a CPU, an MCU or the like. As an example of the volatile memory, there may be cited a RAM or the like.

As an example of the non-volatile memory, there may be cited a ROM, a flash memory, or the like.

Figure 3:
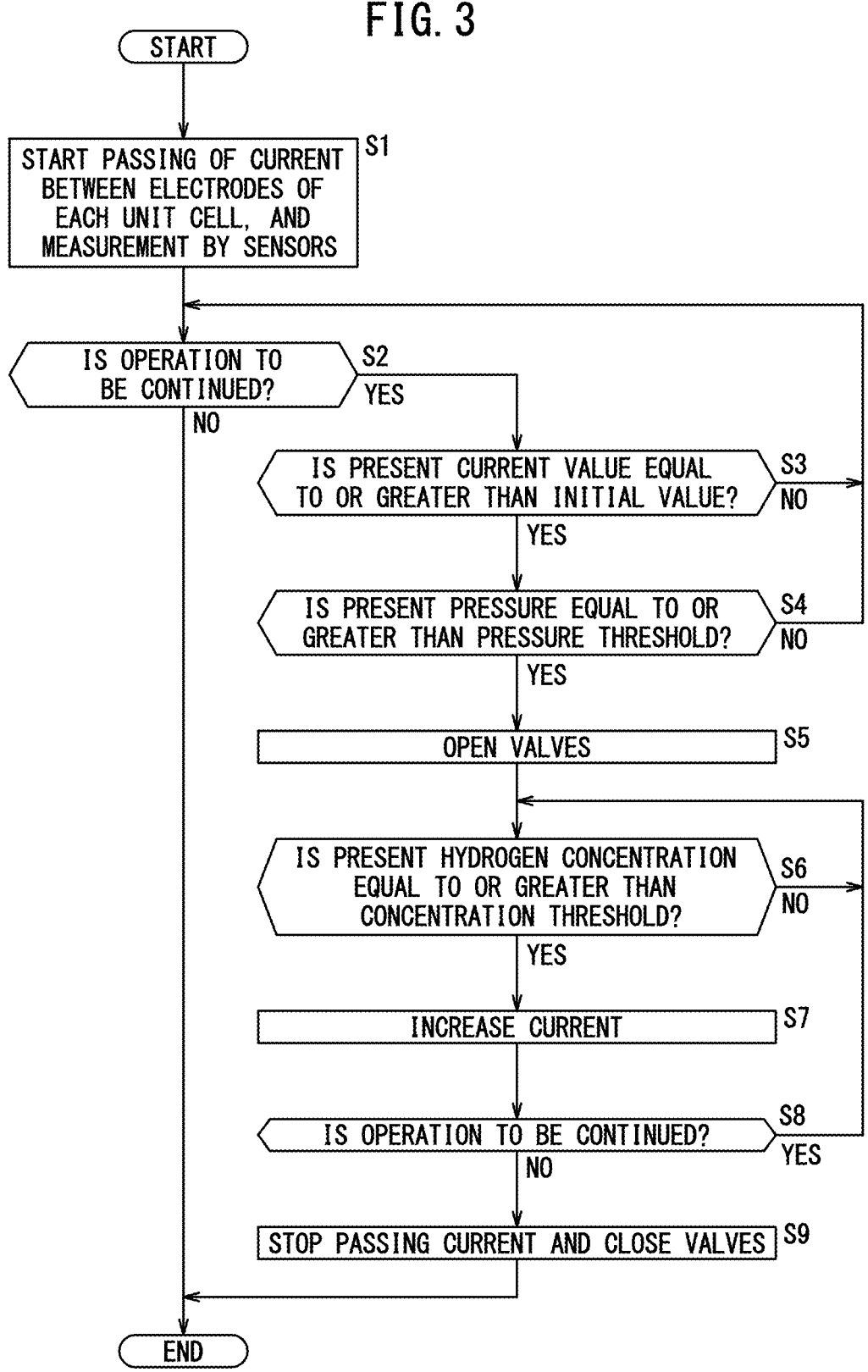
FIG. 3 is a flow chart illustrating a procedure of a control process.

For example, upon receiving a start command for the water electrolysis stack 12, the control device 26 executes a control process. FIG. 3 is a flow chart illustrating a procedure of the control process. FIG. 4 is a time chart during the control process. In a state before the water electrolysis stack 12 is started (in a stopped state of the water electrolysis stack 12), the pressure control valve 18 is closed, and no gas is supplied to the downstream side of the pressure control valve 18. In addition, in a state before the water electrolysis stack 12 is started (in a stopped state of the water electrolysis stack 12), the shut-off valve 63 is closed, and no gas is supplied to the downstream side of the shut-off valve 63.

In step S1, the control device 26 controls the power supply device 16 to start passing a current of a preset initial current value between the anode 32 and the cathode 33 of each unit cell 30. In this case, the current value of the current passed between the anode 32 and the cathode 33 gradually increases (see FIG. 4). As the current increases, water electrolysis in the water electrolysis stack 12 is started, and the pressure of the oxygen-containing gas that contains the oxygen gas generated in the water electrolysis stack 12 increases (see FIG. 4).

The control device 26 starts measurement by the concentration sensor 22 and the pressure sensor 24. In this case, the control device 26 starts to store, in the storage medium together with the detection time, the hydrogen concentration in the oxygen-containing gas as detected by the concentration sensor 22, and the pressure of the oxygen-containing gas as detected by the pressure sensor 24. When passing of the current between the electrodes of each unit cell 30 and the measurement by the sensors are started, the control process proceeds to step S2.

In step S2, the control device 26 determines whether or not to continue the operation of the water electrolysis stack 12. When a first condition or a second condition is not satisfied, the control device 26 determines not to continue the operation of the water electrolysis stack 12. In this case, the control process is ended. On the other hand, when the first condition or the second condition is satisfied, the control device 26 determines to continue the operation of the water electrolysis stack 12. In this case, the control process proceeds to step S3. The first condition is a case where the current value does not reach an initial value even after a predetermined first period has elapsed from the start of passing of the current between the electrodes of each unit cell 30. The second condition is a case where the pressure of the oxygen-containing gas detected by the pressure sensor 24 does not reach a predetermined pressure threshold even after a predetermined second period has elapsed from the start of passing of the current between the electrodes of each unit cell 30.

In step S3, the control device 26 acquires a present current value from the power supply device 16, and compares the present current value with the initial value. When the present current value is less than the initial value, the control process returns to step S2. On the other hand, when the present current value is equal to or greater than the initial value, the control process proceeds to step S4.

In step S4, the control device 26 acquires a present pressure detected by the pressure sensor 24, and compares the present pressure with a predetermined pressure threshold. When the present pressure is less than the pressure threshold, the control process returns to step S2. On the other hand, when the present pressure is equal to or greater than the pressure threshold, the control process proceeds to step S5.

In step S5, the control device 26 opens the pressure control valve 18 (see FIG. 4). In this case, the control device 26 adjusts the opening degree of the pressure control valve 18 so as to form a passage narrower than the discharge pipe 40. Further, the control device 26 opens the shut-off valve 63. When the pressure control valve 18 and the shut-off valve 63 are opened, the control process proceeds to step S6.

In step S6, the control device 26 acquires a present hydrogen concentration detected by the concentration sensor 22, and compares the present hydrogen concentration with a predetermined concentration threshold. When the present hydrogen concentration is less than the concentration threshold, the control process remains at step S6. On the other hand, when the present hydrogen concentration is equal to or greater than the concentration threshold, the control process proceeds to step S7.

In step S7, the control device 26 increases the current passed between the electrodes of each unit cell 30. In this case, the control device 26 sets, as a target current value, a result obtained by adding a predetermined additional value VL (see FIG. 4) to the present current value. After setting the target current value, the control device 26 controls the power supply device 16 so that the current of the target current value is passed. When the current passed between the electrodes of each unit cell 30 increases, the reaction rate of water electrolysis in the water electrolysis stack 12 increases. Therefore, the pressure of the oxygen-containing gas that contains the oxygen gas generated in the water electrolysis stack 12 increases (see FIG. 4). When passing of the current of the target current value is started, the control process proceeds to step S8.

In step S8, the control device 26 determines whether or not to continue the operation of the water electrolysis stack 12. When a third condition is satisfied, the control device 26 determines to continue the operation of the water electrolysis stack 12. In this case, the control process returns to step S6. On the other hand, when the third condition is not satisfied, the control device 26 determines not to continue the operation of the water electrolysis stack 12. In this case, the control process proceeds to step S9. The third condition is a case where the hydrogen concentration detected by the concentration sensor 22 does not fall below the concentration threshold even when the additional value VL is added a predetermined number of times.

In step S9, the control device 26 stops passing the current between the electrodes of the unit cells 30, and closes the pressure control valve 18 and the shut-off valve 63. When passing of the current between the electrodes of each unit cell 30 is stopped and the pressure control valve 18 and the shut-off valve 63 are closed, the control process is ended.

In this manner, the control device 26 adjusts the current passed between the electrodes of each unit cell 30, based on the hydrogen concentration in the oxygen-containing gas discharged from the water electrolysis stack 12. As a result, even when a change occurs in the temperature of the water electrolysis stack 12, the degree of progress of deterioration of the electrolyte membrane 31, or the like, the hydrogen concentration in the oxygen-containing gas can be kept at a low level.

Further, in the present embodiment, the control device 26 closes the pressure control valve 18 from when the current starts to be passed until when the pressure detected by the pressure sensor 24 reaches the predetermined pressure threshold. When the pressure reaches the pressure threshold, the control device 26 opens the pressure control valve 18. Consequently, the pressure of the oxygen-containing gas can be increased more quickly than in a case where the pressure control valve 18 is always open, and as a result, the hydrogen concentration in the oxygen-containing gas can be reduced.

Further, in the present embodiment, the control device 26 adjusts the current passed between the electrodes of each unit cell 30 after opening the pressure control valve 18. As a result, the control load of the control device 26 can be reduced, and as a result, energy efficiency can be improved.

The above-described embodiment may be modified as follows.

For example, the downstream end of the oxygen supply pipe 45 may be opened to a room instead of being connected to the oxygen tank 60. It should be noted that the room may be a room formed inside a moving object that is movable in a closed space. In this case, the water electrolysis system 10 is mounted on the moving object.

In the water electrolysis system 10 according to the above-described embodiment, the oxygen-containing gas discharged from the water electrolysis stack 12 and passing through the inner space of each hollow tube 52 is reduced in moisture content and supplied to the concentration sensor 22 provided in the discharge pipe 40. Thereafter, the oxygen-containing gas is returned from the downstream end portion of the discharge pipe 40 to the space outside the hollow tubes 52 and humidified. The humidified oxygen-containing gas is supplied via the oxygen supply pipe 45 to the room replaced by the oxygen tank 60. Therefore, it is possible to supply, to the room, the oxygen-containing gas humidified to a state suitable for human respiration while suppressing a decrease in measurement accuracy of the concentration sensor 22 due to moisture. Further, since the oxygen-containing gas generated in the water electrolysis stack 12 is dried and then humidified again and supplied to the room, the utilization efficiency of the oxygen-containing gas can be enhanced.

Further, for example, the dryer 20 may be a heat exchange dryer. In the case where the dryer 20 is a heat exchange dryer, the dryer 20 may use heat generated in the water electrolysis stack 12. The dryer 20 may also be removed. In this case, the downstream end portion of the discharge pipe 40 is connected to the oxygen tank 60. Further, the check valve 61, the filter 62, and the shut-off valve 63 are provided in the discharge pipe 40.

Further, for example, the supply destination of the oxygen supply pipe 45 may be the inside of the room of the moving object on which the water electrolysis system 10 is mounted.

Furthermore, for example, during a period in which the hydrogen concentration detected by the concentration sensor 22 exceeds the predetermined concentration threshold, the control device 26 may gradually increase the current value of the current passed between the electrodes of each unit cell 30.

The invention and effects that can be grasped from the above description will be described below.

(1) The present invention is characterized by the water electrolysis system (10) provided with the water electrolysis stack (12) including the electrolyte membrane (31), and the anode (32) and the cathode (33) that sandwich the electrolyte membrane. The water electrolysis system includes: the power supply device (16) configured to pass a current between the anode and the cathode; the pressure control valve (18) configured to narrow the passage of the discharge pipe (40) through which oxygen-containing gas flows, the oxygen-containing gas being discharged from the water electrolysis stack and containing oxygen gas generated by water electrolysis in the water electrolysis stack; the concentration sensor (22) provided in the discharge pipe at a location downstream of the pressure control valve, and configured to detect the hydrogen concentration in the oxygen-containing gas; and a control device (26) configured to control the power supply device, wherein the control device adjusts the current passed between the anode and the cathode based on the hydrogen concentration.

According to this feature, even when a change occurs in the temperature of the water electrolysis stack, the degree of progress of deterioration of the electrolyte membrane, or the like, the hydrogen concentration in the oxygen-containing gas can be kept at a low level. Note that the concentration sensor is provided in the discharge pipe at a location downstream of the pressure control valve.

Therefore, the pressure of the oxygen-containing gas flowing downstream of the pressure control valve becomes lower than the pressure of the oxygen-containing gas flowing upstream of the pressure control valve. As a result, the relative humidity of the oxygen-containing gas decreases. Therefore, compared to a case where the concentration sensor is provided in the discharge pipe at a location upstream of the pressure control valve, a decrease in measurement accuracy due to moisture can be suppressed.

(2) In the water electrolysis system of the present invention, when the hydrogen concentration exceeds the predetermined concentration threshold, the control device may increase the current. According to this feature, the reaction rate of the water electrolysis in the water electrolysis stack increases, and the pressure of the oxygen-containing gas obtained on the anode side of the water electrolysis stack increases. As a result, the amount of hydrogen gas permeating through the electrolyte membrane from the cathode side toward the anode side can be reduced, and the hydrogen concentration in the oxygen-containing gas can be reduced.

(3) In the water electrolysis system of the present invention, when the hydrogen concentration exceeds the predetermined concentration threshold, the control device may set the target current value obtained by adding the predetermined additional value (VL) to the present current value, and control the power supply device in a manner so that the current of the target current value is passed. According to this feature, the current can be increased stepwise each time the hydrogen concentration exceeds the concentration threshold. As a result, the hydrogen concentration in the oxygen-containing gas can be reduced stepwise.

(4) The water electrolysis system of the present invention may further include the pressure sensor (24) provided in the discharge pipe at a location between the water electrolysis stack and the pressure control valve, and configured to detect the pressure of the oxygen-containing gas, wherein the pressure control valve can be opened and closed under control of the control device, and the control device may close the pressure control valve from when the current starts to be passed until when the pressure reaches the predetermined pressure threshold, and open the pressure control valve when the pressure reaches the predetermined pressure threshold. According to this feature, the pressure of the oxygen-containing gas can be increased more quickly than in a case where the pressure control valve is always open, and as a result, the hydrogen concentration in the oxygen-containing gas can be reduced.

(5) In the water electrolysis system of the present invention, the control device may adjust the current after the pressure control valve is opened. According to this feature, the control load of the control device can be reduced, and as a result, energy efficiency can be improved.

(6) The water electrolysis system of the present invention may further include the dryer (20) provided in the discharge pipe at a location between the water electrolysis stack and the pressure control valve, and configured to dry the oxygen-containing gas. According to this feature, a decrease in measurement accuracy of the concentration sensor due to moisture can be suppressed.

(7) In the water electrolysis system of the present invention, the dryer may include the hollow tube (52) disposed inside the discharge pipe and capable of discharging water vapor contained in the oxygen-containing gas, and, by using a pressure difference between the inside and the outside of the hollow tube, the hollow tube may discharge, to the space between the hollow tube and the discharge pipe, the water vapor contained in the oxygen-containing gas flowing inside the hollow tube. According to this feature, the amount of operating energy can be suppressed more easily than in the case of a heat exchange dryer. As a result, energy efficiency can be improved.

(8) In the water electrolysis system of the present invention, the gas introduction portion (53) and the gas discharge portion (54) may be formed on the wall of the discharge pipe in which the hollow tube is disposed, the downstream end portion of the discharge pipe located on the downstream side of the pressure control valve may be connected to the gas introduction portion, and the oxygen supply pipe (45) configured to supply wet oxygen may be connected to the gas discharge portion. According to this feature, it is possible to supply the oxygen-containing gas in a wet state to the supply destination while supplying the oxygen-containing gas in a dry state to the concentration sensor.

Moreover, the present invention is not limited to the above-described disclosure, and various configurations can be adopted therein without departing from the essence and gist of the present invention.

The invention claimed is:

1. A water electrolysis system comprising:
a water electrolysis stack including an electrolyte membrane, and an anode and a cathode that sandwich the electrolyte membrane;
a power supply device configured to pass a current between the anode and the cathode;
a pressure control valve configured to narrow a passage of a discharge pipe through which oxygen-containing gas flows, the oxygen-containing gas being discharged from the water electrolysis stack and containing oxygen gas generated by water electrolysis in the water electrolysis stack;
a concentration sensor provided in the discharge pipe at a location downstream of the pressure control valve, and configured to detect a hydrogen concentration in the oxygen-containing gas; and
a control device configured to control the power supply device,
wherein the control device comprises one or more processors that execute computer-executable instructions stored in a memory, and the one or more processors execute the computer-executable instructions to cause the control device to adjust the current passed between the anode and the cathode based on the hydrogen concentration.

2. The water electrolysis system according to claim 1, wherein
when the hydrogen concentration exceeds a predetermined concentration threshold, the one or more processors cause the control device to increase the current.

3. The water electrolysis system according to claim 1, wherein
when the hydrogen concentration exceeds a predetermined concentration threshold, the one or more processors cause the control device to set a target current value obtained by adding a predetermined additional value to a present current value, and to control the power supply device in a manner so that the current of the target current value is passed.

4. The water electrolysis system according to claim 1, further comprising a pressure sensor provided in the discharge pipe at a location between the water electrolysis stack and the pressure control valve, and configured to detect a pressure of the oxygen-containing gas,
wherein the pressure control valve is configured to be opened and closed under control of the control device, and
the one or more processors cause the control device to close the pressure control valve from when the current starts to be passed until when the pressure reaches a predetermined pressure threshold, and to open the pressure control valve when the pressure reaches the predetermined pressure threshold.

5. The water electrolysis system according to claim 4, wherein
the one or more processors cause the control device to adjust the current after the pressure control valve is opened.

6. The water electrolysis system according to claim 1, further comprising a dryer provided in the discharge pipe at a location between the water electrolysis stack and the pressure control valve, and configured to dry the oxygen-containing gas.

7. The water electrolysis system according to claim 6, wherein
the dryer includes a hollow tube disposed inside the discharge pipe and configured to discharge water vapor contained in the oxygen-containing gas, and
by using a pressure difference between an inside and an outside of the hollow tube, the hollow tube discharges, to a space between the hollow tube and the discharge pipe, the water vapor contained in the oxygen-containing gas flowing inside the hollow tube.

8. The water electrolysis system according to claim 7, wherein
a gas introduction portion and a gas discharge portion are formed on a wall of the discharge pipe in which the hollow tube is disposed,
a downstream end portion of the discharge pipe located on a downstream side of the pressure control valve is connected to the gas introduction portion, and
an oxygen supply pipe configured to supply wet oxygen is connected to the gas discharge portion.

* * * * *